US009817523B2

(12) United States Patent
Mohindra et al.

(10) Patent No.: US 9,817,523 B2
(45) Date of Patent: Nov. 14, 2017

(54) CAPACITIVE TOUCH PANEL FOR MITIGATING AND/OR EXAGGERATING FLOATING CONDITION EFFECTS

(75) Inventors: Rishi Mohindra, Milpitas, CA (US); Guozhong Shen, San Jose, CA (US); Kenneth W. Knox, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 13/370,121

(22) Filed: Feb. 9, 2012

(65) Prior Publication Data
US 2013/0207924 A1   Aug. 15, 2013

(51) Int. Cl.
*G06F 3/044*   (2006.01)

(52) U.S. Cl.
CPC ..................... *G06F 3/044* (2013.01)

(58) Field of Classification Search
CPC ............... G06F 3/044; G06F 2203/04104
USPC ................... 345/174, 173; 178/18.06
See application file for complete search history.

(56) References Cited

U.S. PATENT DOCUMENTS

| 8,278,571 | B2 | 10/2012 | Orsley | |
|---|---|---|---|---|
| 2010/0079402 | A1* | 4/2010 | Grunthaner | G06F 3/044 345/174 |
| 2010/0110038 | A1* | 5/2010 | Mo | G06F 3/044 345/174 |
| 2010/0302201 | A1* | 12/2010 | Ritter | G06F 3/044 345/174 |
| 2011/0007028 | A1 | 1/2011 | Curtis et al. | |
| 2011/0007030 | A1 | 1/2011 | Mo et al. | |
| 2011/0025639 | A1 | 2/2011 | Trend et al. | |
| 2011/0115717 | A1* | 5/2011 | Hable | G06F 3/0416 345/173 |

(Continued)

FOREIGN PATENT DOCUMENTS

| CN | 101847071 A | 9/2010 |
|---|---|---|
| CN | 101943975 A | 1/2011 |
| CN | 101995993 A | 3/2011 |

OTHER PUBLICATIONS

Tong-Hun Hwang, Wan-Hai Cui, Ik-Seok Yang, Oh-Kyong Kwon; A Highly Area-Efficient Controller for Capacitive Touch Screen Panel Systems; IEEE Transactions on Consumer Electronics; vol. 56, No. 2; May 2010; pp. 1115 to 1122.

*Primary Examiner* — Ibrahim Khan
(74) *Attorney, Agent, or Firm* — Weaver Austin Villeneuve & Sampson LLP

(57) ABSTRACT

A capacitive touch panel includes elongated drive electrodes arranged next to one another and elongated sensor electrodes arranged next to one another across the drive electrodes. Together, the drive electrodes and the sensor electrodes define a coordinate system where each coordinate location comprises a capacitor formed at an intersection between one of the drive electrodes and one of the sensor electrodes. In implementations, the drive electrodes and/or the sensor electrodes are configured to block capacitance between a touch at a coordinate location and the drive electrodes during a floating condition for the panel. In other implementations, the drive electrodes and/or the sensor electrodes are configured to exaggerate capacitance between a touch at a coordinate location and the drive electrodes during a floating condition for the panel.

7 Claims, 17 Drawing Sheets

(56) References Cited

U.S. PATENT DOCUMENTS

| | | | |
|---|---|---|---|
| 2012/0229414 A1* | 9/2012 | Ellis | G06F 3/044 345/174 |
| 2013/0155000 A1* | 6/2013 | Trend | G06F 3/044 345/174 |
| 2013/0181943 A1* | 7/2013 | Bulea | G06F 3/044 345/174 |
| 2013/0207923 A1 | 8/2013 | Mohindra | |

* cited by examiner

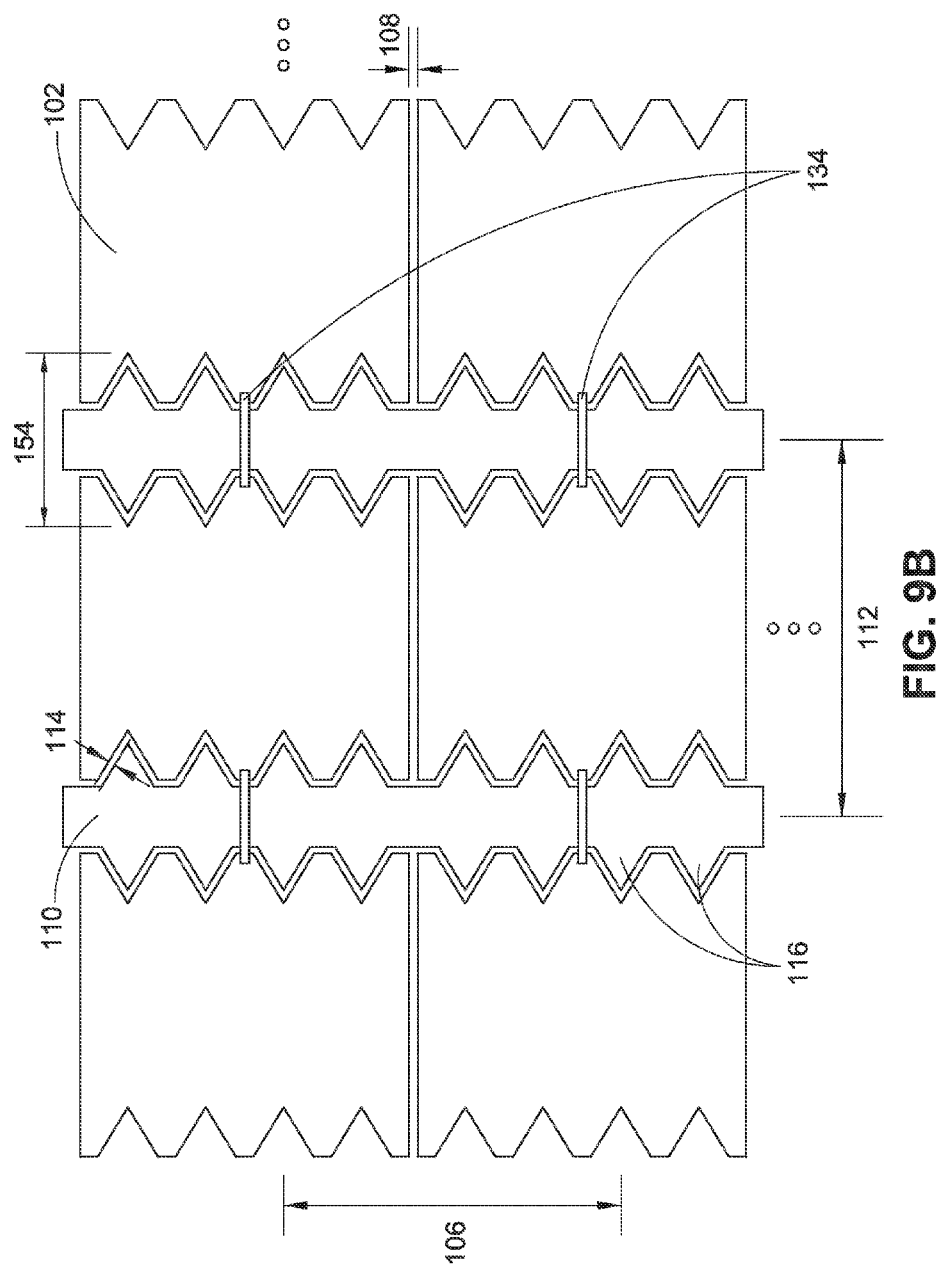

CAPACITIVE TOUCH PANEL FOR MITIGATING AND/OR EXAGGERATING FLOATING CONDITION EFFECTS

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

A touch screen is an electronic visual display that incorporates a touch panel overlying a display to detect the presence and/or location of a touch within the display area of the screen. Touch screens are common in devices such as all-in-one computers, tablet computers, satellite navigation devices, gaming devices, and smartphones. A touch screen enables an operator to interact directly with information that is displayed by the display underlying the touch panel, rather than indirectly with a pointer controlled by a mouse or touchpad. Capacitive touch panels are often used with touch screen devices. A capacitive touch panel generally includes an insulator, such as glass, coated with a transparent conductor, such as indium tin oxide (ITO). As the human body is also an electrical conductor, touching the surface of the panel results in a distortion of the panel's electrostatic field, measurable as a change in capacitance.

SUMMARY

A capacitive touch panel that uses patterns for drive and/or sensor electrodes and/or dielectric spacing configured to minimize and/or exaggerate effects of a floating condition and/or to mitigate effects of ghosting is disclosed. In one or more implementations, the capacitive touch panel comprises elongated drive electrodes arranged next to one another and elongated sensor electrodes arranged next to one another across the drive electrodes. Together, the drive electrodes and the sensor electrodes define a coordinate system where each coordinate location comprises a capacitor formed at an intersection between one of the drive electrodes and one of the sensor electrodes. In implementations, the drive electrodes and/or the sensor electrodes are configured to block capacitance between a touch at a coordinate location and the drive electrodes during a floating condition for the panel. In other implementations, the drive electrodes and/or the sensor electrodes are configured to exaggerate capacitance between a touch at a coordinate location and the drive electrodes during a floating condition for the panel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIGS. 9A and 9B are top plan views illustrating sensor and drive electrodes for a touch panel, where the sensor and drive electrodes are positioned on a single layer with jumpers connecting portions of the drive electrodes, and where the sensor electrodes include repeating protrusions in accordance with example implementations of the present disclosure.

DETAILED DESCRIPTION

Overview

Figure 1A:
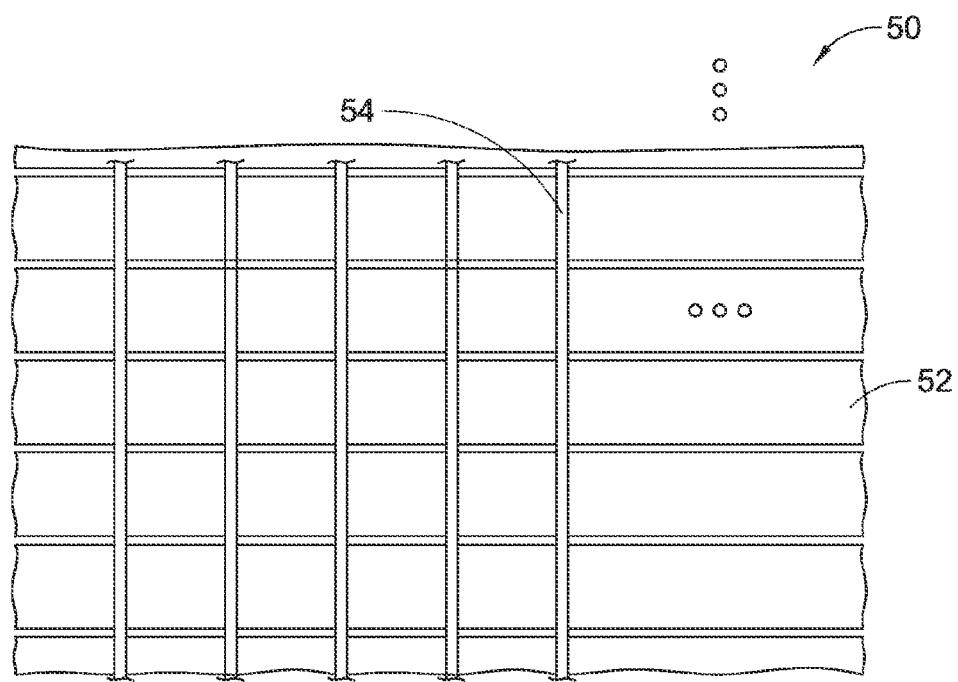
FIG. 1A is a top plan view illustrating rectangular-shaped electrode traces for a capacitive touch panel.
Figure 1B:
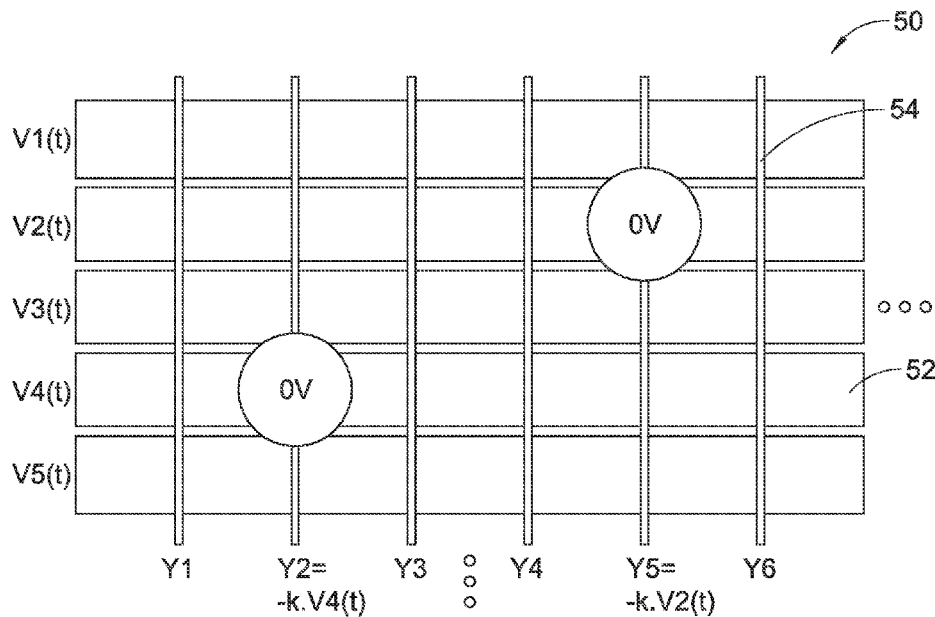
FIG. 1B is a top plan view of the capacitive touch panel electrodes illustrated in FIG. 1A, further illustrating a multi-touch condition where two instruments (e.g., fingers) are touching the surface of the panel at the same time.

Referring now to FIGS. 1A through 3, cross-bar X and Y ITO patterns can be used for drive traces 52 and sensor traces 54 in mutual capacitance based capacitive touch panels 50. The drive and sensor traces 52, 54 correspond to a coordinate system, where each coordinate location (pixel) comprises a capacitor formed at an intersection between a drive trace 52 and a sensor trace 54. The drive traces 52 are connected to a current source to generate a local electrostatic field at each capacitor, and a change in the local electrostatic field generated by the touch of an instrument (e.g., a finger or a stylus) at each capacitor causes a change in capacitance at the corresponding coordinate location/pixel. In some cases, more than one touch can be sensed at differing coordinate locations simultaneously (e.g., as shown in the multi-touch implementation of FIG. 1B). The cross-bar patterns can be rectangular or diamond-shaped and can be formed using two (2) layers (e.g., a drive layer and a sensor layer) or 1.5-layers (e.g., drive and sensor traces on a single layer, with jumpers connecting portions of the drive and/or sensor traces together).

Figure 1C:
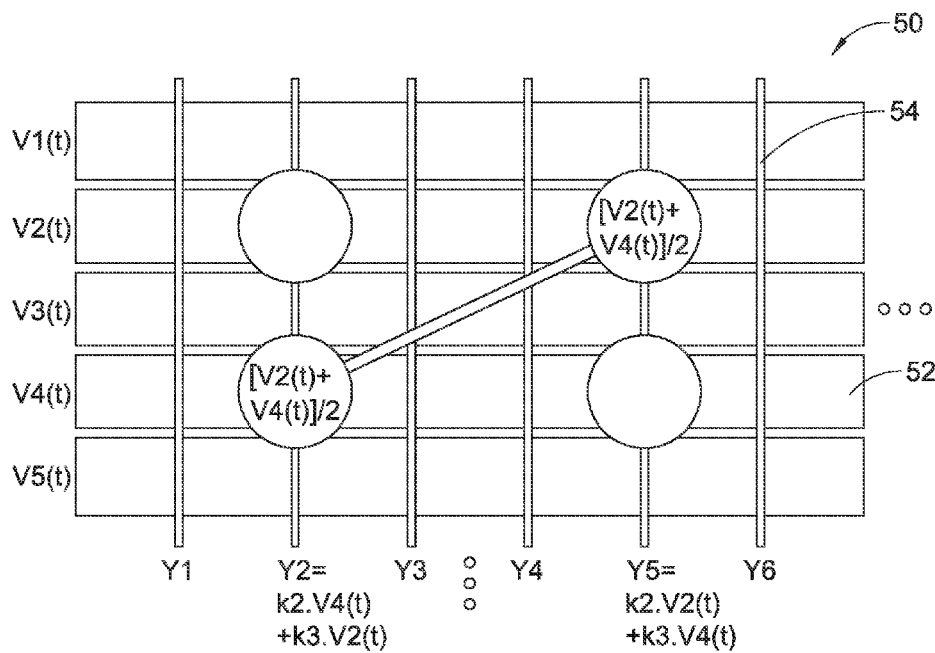
FIG. 1C is a top plan view of the capacitive touch panel electrodes illustrated in FIG. 1A, further illustrating a multi-touch condition where two instruments are touching the surface of the panel at the same time when the touch panel is not grounded, creating "ghost" images.

When the capacitive touch panel 50 is "floating," or not electrically connected to ground (e.g., earth ground), the measured response to a touch on a touch surface 56 of the panel can be distorted and/or inverted, and may become very small, approaching the noise threshold of the panel circuitry. This floating condition can occur when a human operator is using the capacitive touch panel 50. For example, the capacitive touch panel 50 may be employed with an electronic device such as a smartphone, an internet tablet, and so forth. In such implementations, the electronic device may be situated on an insulated surface, such as a wooden table, rather than held by the operator. The operator may use the capacitive touch panel 50 without physically holding the electronic device (e.g., when answering a phone using a single touch, and so forth). This can lead to inaccurate or missed finger touch reporting and/or multiple-finger reporting around a single touch area. Further, "ghost" fingers, or signals that indicate the presence of a touch not being made, can be detected in the case of a multi-touch implementation (e.g., as illustrated in FIG. 1C). Ghosting can occur for multi-touch when a sensor electrode 54 receives a signal from a drive electrode 52 that does not intersect with it under a touch. The decoding of the touch input produces a false touch detection (e.g., as a +ve dCm profile, where dCm represents a reduction in mutual capacitance between the sensor electrode 54 and the drive electrode 52).

With reference to rectangular X and Y cross-bar patterns, the mutual capacitance, Cm, between a drive trace and a sensor trace can be approximately described as follows for parallel plates:

$$Cm = \frac{\varepsilon_0}{G} WL \left(1 + \frac{G}{\pi W} + \frac{G}{\pi W} \ln\left(\frac{2\pi W}{G}\right)\right) \times \left(1 + \frac{G}{\pi L} + \frac{G}{\pi L} \ln\left(\frac{2\pi L}{G}\right)\right)$$

where W is defined as the length of a column, and L is defined as the pitch of a column, such that Cm is equal to Cm_bottom plus Cm_fringe, Cm_bottom is equal to $\varepsilon_0 \times W \times L/G$, and the other terms contribute to the fringe capacitance, Cm_fringe. In some instances, a field solver may be used to predict Cm.

Figure 2:
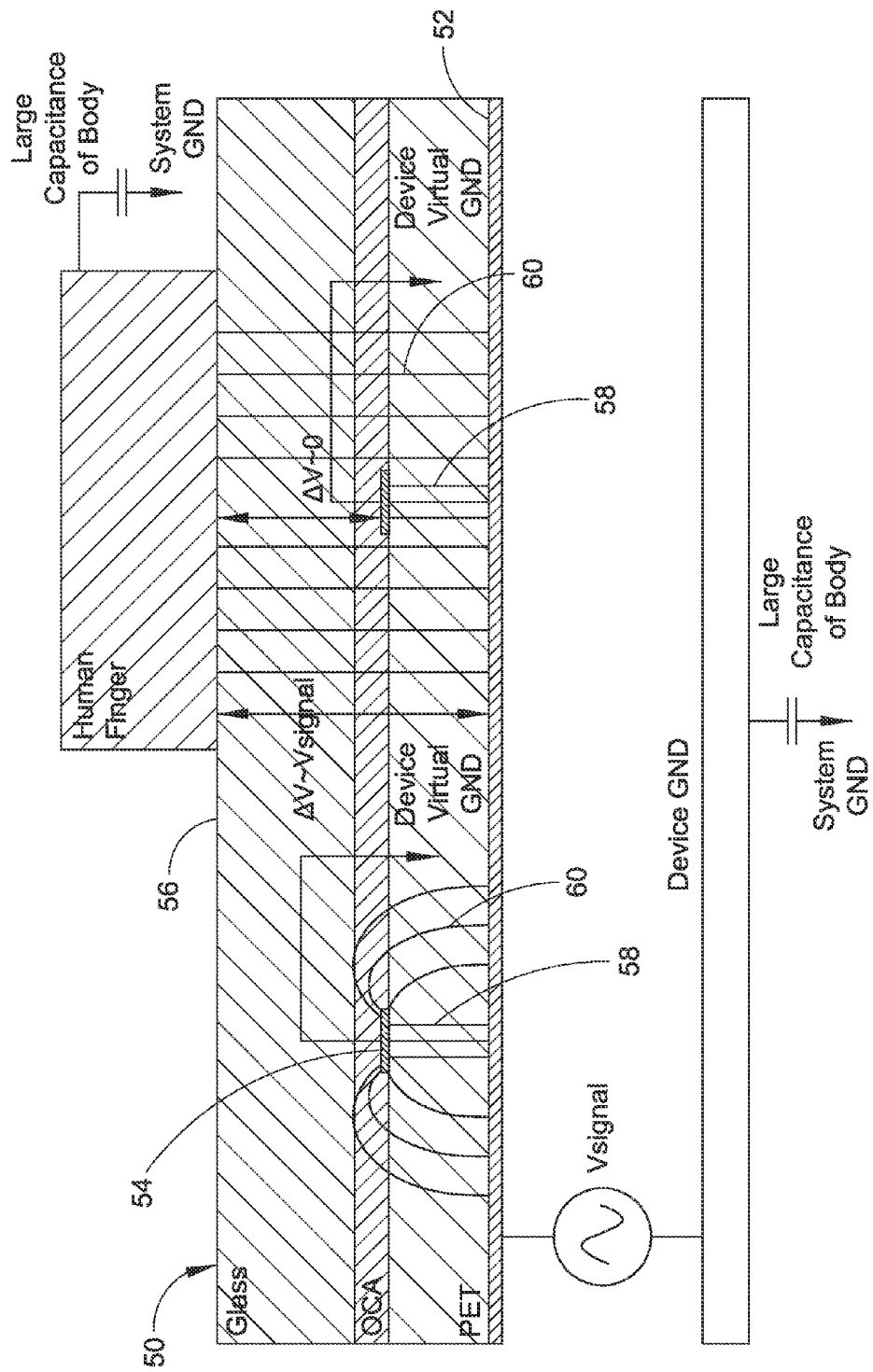
FIG. 2 is a partial cross-sectional side elevation view illustrating an electronic device incorporating a touch panel, where the electronic device is grounded.

Referring now to FIG. 2, a capacitive touch panel 50 is shown in an electronic device being grasped by an operator. In this implementation, Cm_bottom is produced by the vertical electric field lines 58 under the bottom plate of a sensor trace 54. Cm_fringe is produced by the curved electric field lines 60 that are not under the bottom plate region. It should be noted that when the electronic device is held in the hand of an operator, the device ground (GND) is at the same potential as the finger of the operator, since the human body is a good conductor. The sensor trace 54 is at the "virtual ground" potential of an operational amplifier (opamp) circuit that is same as the device's AC ground. Thus, the finger is at the same Alternating Currnet (AC) ground potential as the sensor trace 54.

When a finger touches the grounded panel shown in FIG. 2, it extends a ground plane above the sensor trace 54 (which is also at an AC ground potential), and some of the curved electric field lines 60 terminate onto the finger instead of the sensor trace 54, thereby reducing the Cm by an amount dCm. This reduction in Cm can be detected by, for example, a touch controller Integrated Circuit (IC) that creates a Two-Dimensional (2D) profile of dCm over the panel, referred to as a "raw image," from which finger location is computed (e.g., using a centroid algorithm or another algorithm). If the spacing between the finger and the sensor trace 54 were negligible, then |dCm| would be equal to Cm_fringe, since all of the electric field lines 58, 60 would be substantially vertical around the sensor trace 54, and the mutual capacitance with the finger touching the capacitive touch panel 50, Cm_finger, would be equal to Cm_bottom. However, for a finite separation between a finger and a sensor trace 54, |dCm| is between zero (0) and Cm_fringe. Thus, dCm is equal to Cm_finger minus the value of Cm, and is a negative value.

For a typical dielectric stack up, Cm_bottom is about one picofarad (1 pF), and Cm_fringe is about two tenths of a picofarad (0.2 pF). In this type of configuration, dCm is equal to about minus one tenth of a picofarad (−0.1 pF), which is about half (50%) of Cm_fringe. A predicted value for dCm can be produced using a field solver for each pixel of the capacitive touch panel 50, where a pixel is defined as an intersection of a row (e.g., a drive trace 52) and a column (e.g., a sensor trace 54), as previously described. Generally, dCm is also dependent on the amount of coverage of a pixel by an instrument (e.g., a finger). It should be noted that in cases where a diamond-shaped pattern is used for the cross-bar traces, Cm is mostly from broad-side coupling between rows and columns. Thus, the ratio |dCm/Cm| is typically larger for a diamond pattern.

Figure 3:
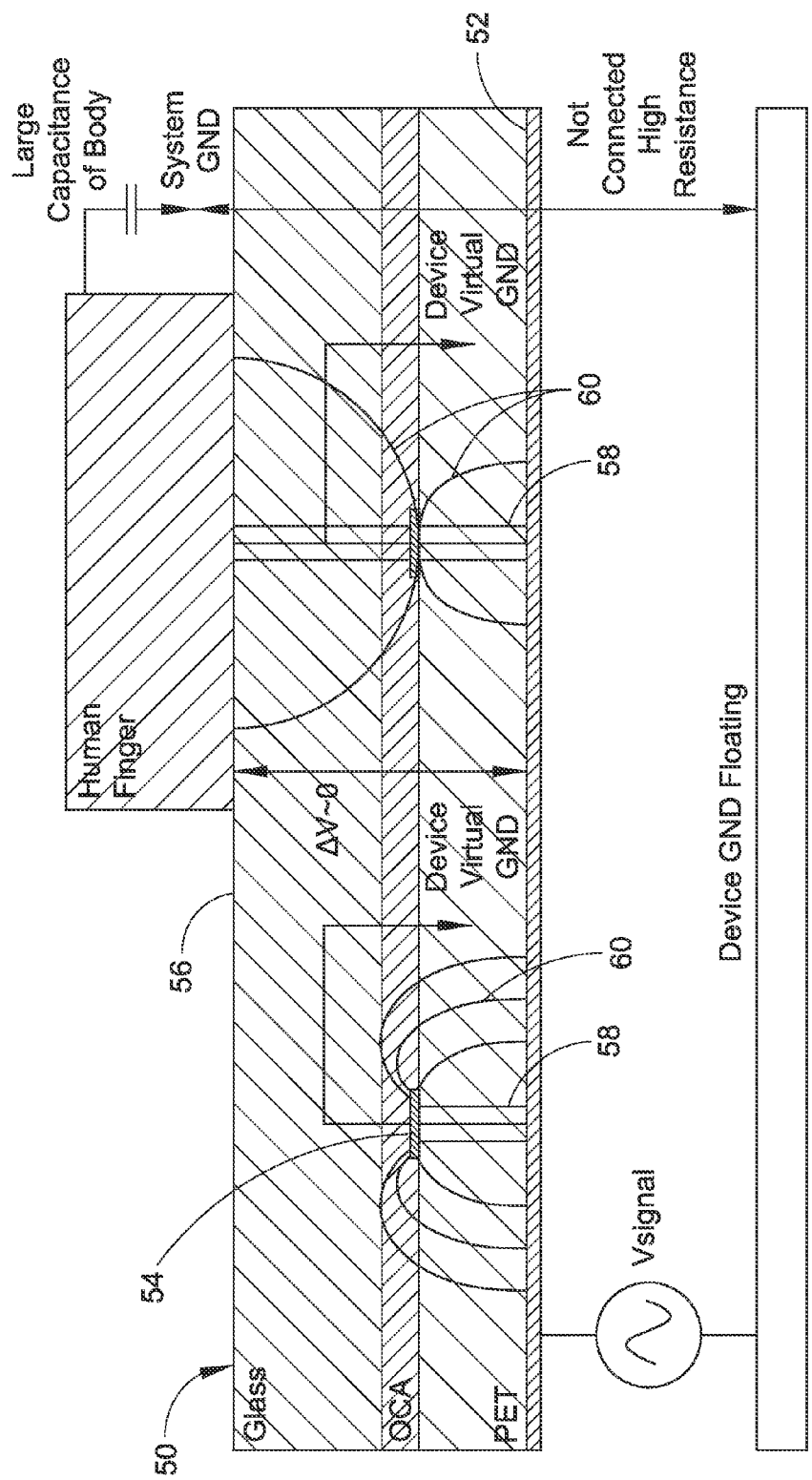
FIG. 3 is a partial cross-sectional side elevation view of the electronic device illustrated in FIG. 2, where the electronic device is not grounded.

Referring now to FIG. 3, when a finger touches a floating panel (e.g., when the electronic device is positioned on a non-grounding surface, such as a wooden table), the finger is not connected to the device's ground and is no longer at the virtual ground potential of the sensor traces 54. In this configuration, the finger is capacitively coupled to the drive traces 52 more than it is coupled to the sensor traces 54 (e.g., when column/sensor area is very small compared to row/drive area). Thus, the finger and the drive traces 52 are at nearly the same AC potential through a lower impedance capacitive coupling between them (e.g., as compared to the capacitive impedance between the finger and the sensor traces 54). The mutual capacitance is effectively increased, since the sensor traces 54 are sandwiched between plates that are at nearly the same AC potential. The finger, instead of attracting electric field lines from a sensor trace 54, adds electric field lines that terminate on the sensor trace 54.

In this configuration, Cm_floating_with_finger is equal to Cm_row_to_column plus Cm_finger_to_column. Thus, dCm_floating is equal to Cm_floating_with_finger minus Cm, and can be strongly positive if the finger is heavily coupled to a drive trace 52 (e.g. if the finger covers the complete pixel's drive trace 52, and the finger to drive trace 52 gap is small). Generally, dCm_floating can vary between negative and positive values, and can also be close to zero (0), based upon the capacitance between the drive trace 52 and the finger, and relative to the capacitance between the sensor traces 54 and the finger. For the purposes of the present discussion, it is assumed that capacitance between the device and the finger's ground is negligible, which is the case when the device is truly isolated from the environment. Based on the amount of overlap of a finger with a pixel's drive trace area, the value of dCm_floating will vary, and may even become slightly negative if the overlap is small. This creates an irregular profile for a finger: a positive or zero (0) dCm for pixels fully covered by a finger, and a positive to negative dCm for pixels partially covered by the finger. In contrast, the non-floating condition only produces a negative dCm profile for a finger, as previously described with reference to FIG. 2.

Accordingly, touch panels are described that use patterns for drive and/or sensor electrodes and/or dielectric spacing configured to minimize and/or exaggerate effects of a floating condition and/or to mitigate effects of ghosting on signals received via the touch panel.

The touch panels can be configured to reduce effects of negative profile detection during a floating condition, making the resulting profile closer to a non-floating condition (e.g., a negative dCm profile). This may be achieved by maintaining the sensor electrodes closer to the AC ground potential of a grounded instrument, such as a finger, than the drive electrodes. For the purposes of the present discussion, this is the same as reducing the drive electrode to finger capacitance and increasing the sensor electrode to finger capacitance. Thus, in implementations, example touch panels can be configured such that the sensor electrode to finger capacitance is much larger than the drive electrode to finger capacitance.

In implementations, separation between a touch surface of the panel and the drive electrodes can be increased, separation between the sensor electrodes and the drive electrodes can be increased, and/or separation between a touch surface of the panel and the sensor electrodes can be decreased (e.g., with respect to a typical capacitive touch panel). Additionally, electric field lines between drive electrodes and an instrument used to touch the panel, such as a finger, can be blocked by using closely spaced sensor electrodes, using multiple sensor electrode lines per sensor electrode connection, using broad sensor electrodes, and/or using one or more grounded electrodes between adjacent sensor electrodes. Further, the sensor and/or the drive electrodes may include fins/protrusions into the spaces between adjacent electrodes, increasing their area. In the case of protrusions used with sensor electrodes, this configuration can provide shielding between a finger and the drive electrodes. Additionally, the area occupied by the drive electrodes may be reduced (e.g., by defining apertures within interior portions of the drive electrodes in regions that do not contribute significantly to Cm via capacitive coupling to the sensor electrodes). It should be noted that these techniques can be used separately or in combination to affect the value of |dCm| and the ratio of |dCm| to Cm, which may be maximized to increase the regular touch profile of a panel (e.g., with respect to a Signal to Noise Ratio (SNR) threshold of the touch panel circuitry).

Further, the touch panels can be configured to enhance, or exaggerate, negative profile detection under a floating condition. This may be particularly useful for one-touch applications, e.g., when a phone rings and a slider or one touch operation is used to answer the phone in a floating condition. In this configuration, for instance, a strong profile may be desirable, such as a positive dCm rather than a weak or near-zero dCm. For subsequent multi-touch and/or editing operations, it may be assumed that the phone will be grasped and will not be floating. For example, separation between a touch surface of the panel and the drive electrodes can be decreased and/or separation between a touch surface of the panel and the sensor electrodes can be increased. Additionally, widely spaced sensor electrodes and/or narrow sensor electrodes can be used. It should be noted that these techniques can be used separately or in combination.

Example Implementations

FIGS. 4 through 10C illustrate example mutual capacitance Projected Capacitive Touch (PCT) panels 100 in accordance with example implementations of the present disclosure. The capacitive touch panels 100 can be used to interface with electronic devices including, but not necessarily limited to: large touch panel products, all-in-one computers, mobile computing devices (e.g., hand-held portable computers, Personal Digital Assistants (PDAs), laptop computers, netbook computers, tablet computers, and so forth), mobile telephone devices (e.g., cellular telephones and smartphones), portable game devices, portable media players, multimedia devices, satellite navigation devices (e.g., Global Positioning System (GPS) navigation devices), e-book reader devices (eReaders), Smart Television (TV) devices, surface computing devices (e.g., table top computers), Personal Computer (PC) devices, as well as with other devices that employ touch-based human interfaces.

The capacitive touch panels 100 may comprise ITO touch panels that include drive electrodes 102, such as cross-bar ITO drive traces/tracks, arranged next to one another (e.g., along parallel tracks, generally parallel tracks, and so forth). In implementations, the drive electrodes 102 can be formed using highly conductive, optically transparent horizontal and/or vertical spines/bars 104. The bars 104 can reduce the resistance of the row and/or column traces, resulting in reduced phase shifts across the panel and reducing the complexity of the touch controller circuitry. The drive electrodes 102 are elongated (e.g., extending along a longitudinal axis). For example, each drive electrode 102 may extend along an axis on a supporting surface, such as a substrate of a capacitive touch panel 100. The drive electrodes 102 have a pitch 106 (e.g., a substantially repetitive spacing between adjacent axes of the drive electrodes 102). In implementations, the drive electrodes 102 also have a characteristic spacing 108 comprising a minimum distance between adjacent edges of the drive electrodes 102.

The capacitive touch panels 100 also include sensor electrodes 110, such as cross-bar ITO sensor traces/tracks, arranged next to one another across the drive electrodes 102 (e.g., along parallel tracks, generally parallel tracks, and so forth). In implementations, the sensor electrodes 110 can be formed using highly conductive, optically transparent horizontal and/or vertical spines/bars 104 (e.g., as previously described). The sensor electrodes 110 are elongated (e.g., extending along a longitudinal axis). For instance, each sensor electrode 110 may extend along an axis on a supporting surface, such as a substrate of a capacitive touch panel 100. The sensor electrodes 110 have a pitch 112 (e.g., a substantially repetitive spacing between adjacent axes of the sensor electrodes 110).

Figure 8A:
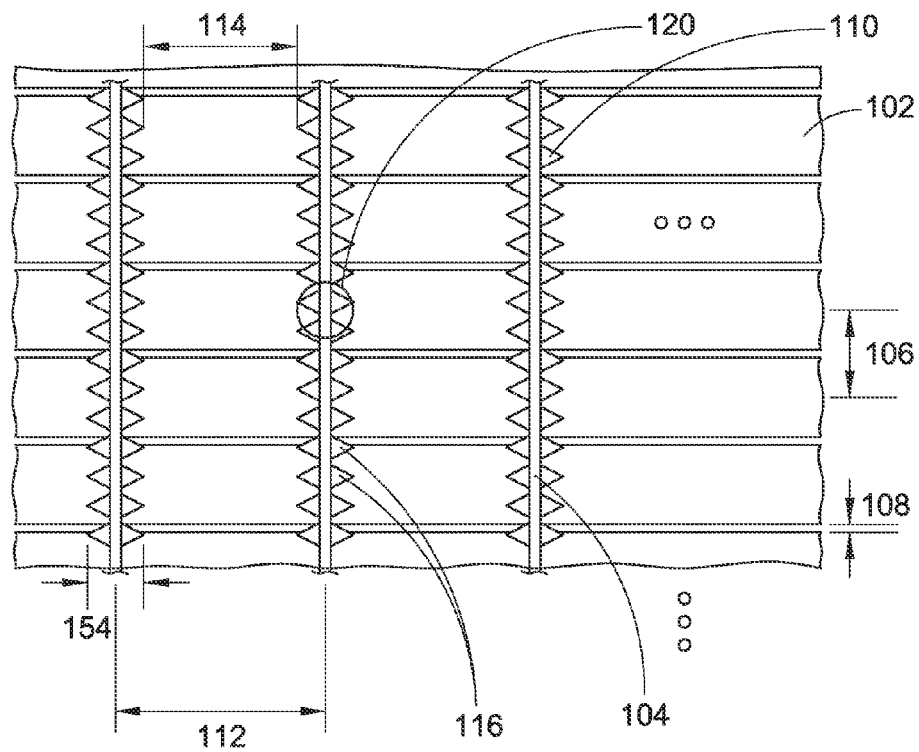
FIG. 8A is a top plan view illustrating sensor and drive electrodes for a touch panel, where the sensor electrodes include repeating protrusions in accordance with example implementations of the present disclosure.
Figure 8B:
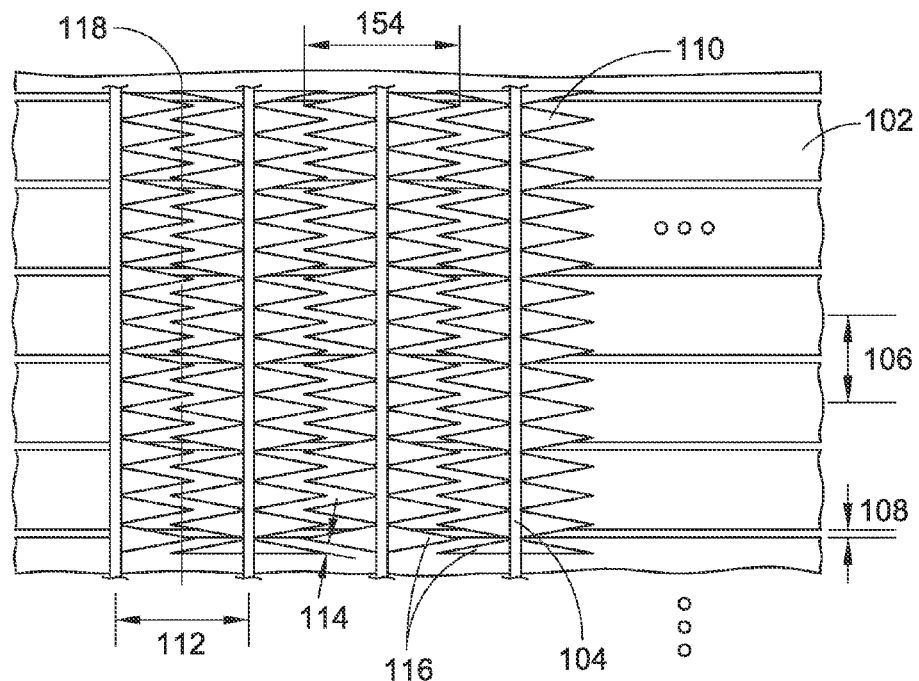
FIG. 8B is a top plan view illustrating sensor and drive electrodes for a touch panel, where the sensor electrodes include repeating protrusions extending past a center line between the sensor and drive electrodes in accordance with example implementations of the present disclosure.

In implementations, the pitch 112 is based upon the touch diameter of a finger. For example, the pitch 112 between adjacent sensor electrodes 110 may be about five millimeters (5 mm) center-to-center. However, a pitch 112 of five millimeters (5 mm) is provided by way of example only and is not meant to be restrictive of the present disclosure. Thus, other implementations may have a pitch 112 of more or less than five millimeters (5 mm). In implementations, the sensor electrodes 110 also have a characteristic spacing 114 comprising a minimum distance between adjacent edges of the sensor electrodes 110. In some instances, the characteristic spacing 114 is measured between adjacent edges of the sensor electrodes 110 in a direction perpendicular to the sensor electrodes 110 (e.g., as shown in FIG. 8A), while in other instances, the characteristic spacing 114 is measured between adjacent edges of the sensor electrodes 110 at an angle relative to the sensor electrodes 110 (e.g., as shown in FIG. 8B).

The drive electrodes 102 and the sensor electrodes 110 define a coordinate system where each coordinate location (pixel) comprises a capacitor formed at each intersection between one of the drive electrodes 102 and one of the sensor electrodes 110. Thus, the drive electrodes 102 are configured to be connected to an electrical current source for generating a local electrostatic field at each capacitor, where a change in the local electrostatic field generated by a finger and/or a stylus at each capacitor causes a decrease in capacitance associated with a touch at the corresponding coordinate location. In this manner, more than one touch can be sensed at differing coordinate locations simultaneously (or at least substantially simultaneously). In implementations, the drive electrodes 102 can be driven by the electrical current source in parallel, e.g., where a set of different signals are provided to the drive electrodes 102. In other implementations, the drive electrodes 102 can be driven by the electrical current source in series, e.g., where each drive electrode 102 or subset of drive electrodes 102 is driven one at a time.

Figure 4:
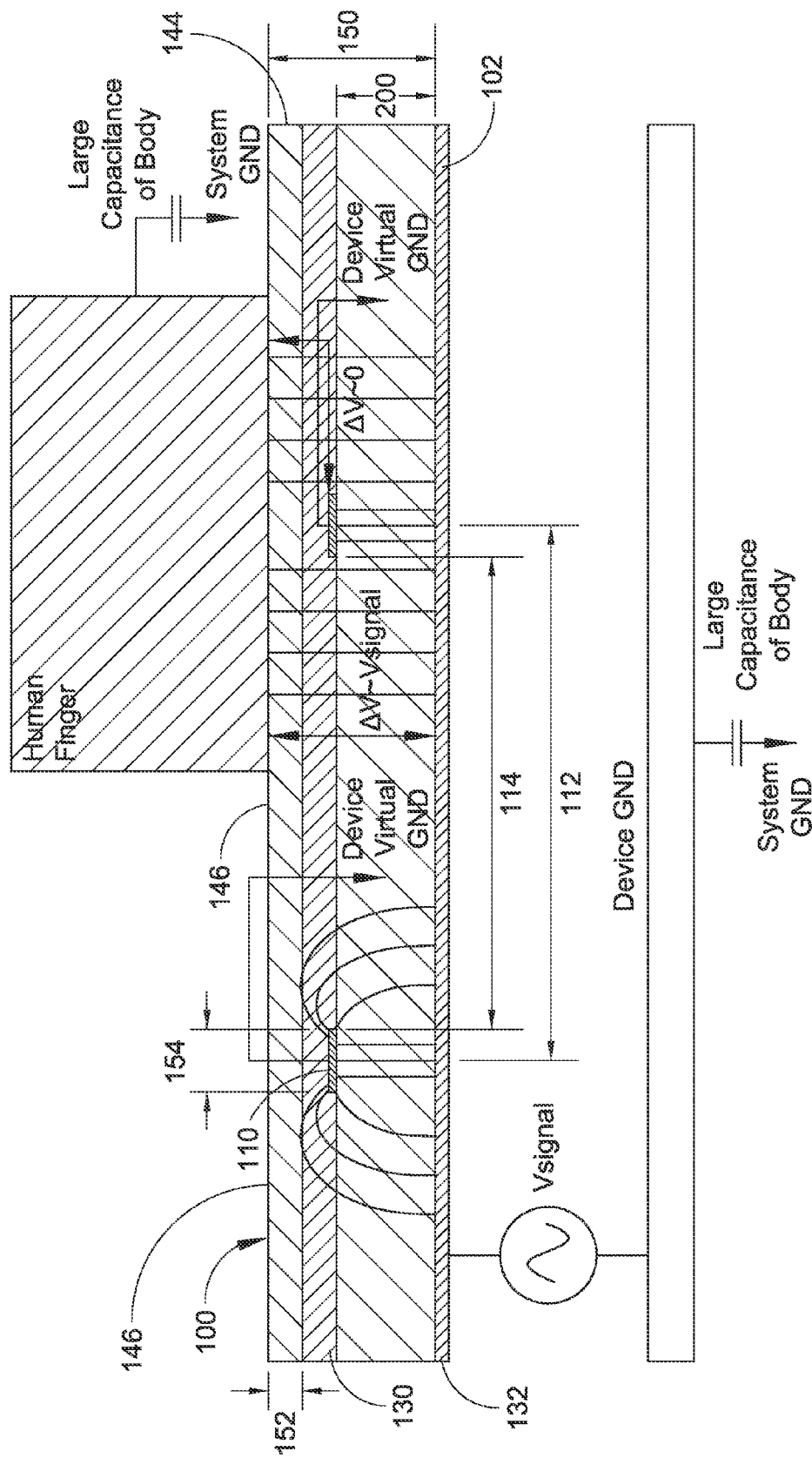
FIG. 4 is a partial cross-sectional side elevation view illustrating an electronic device incorporating a touch panel having a reduced glass thickness in accordance with example implementations of the present invention, where the electronic device is grounded.
Figure 5:
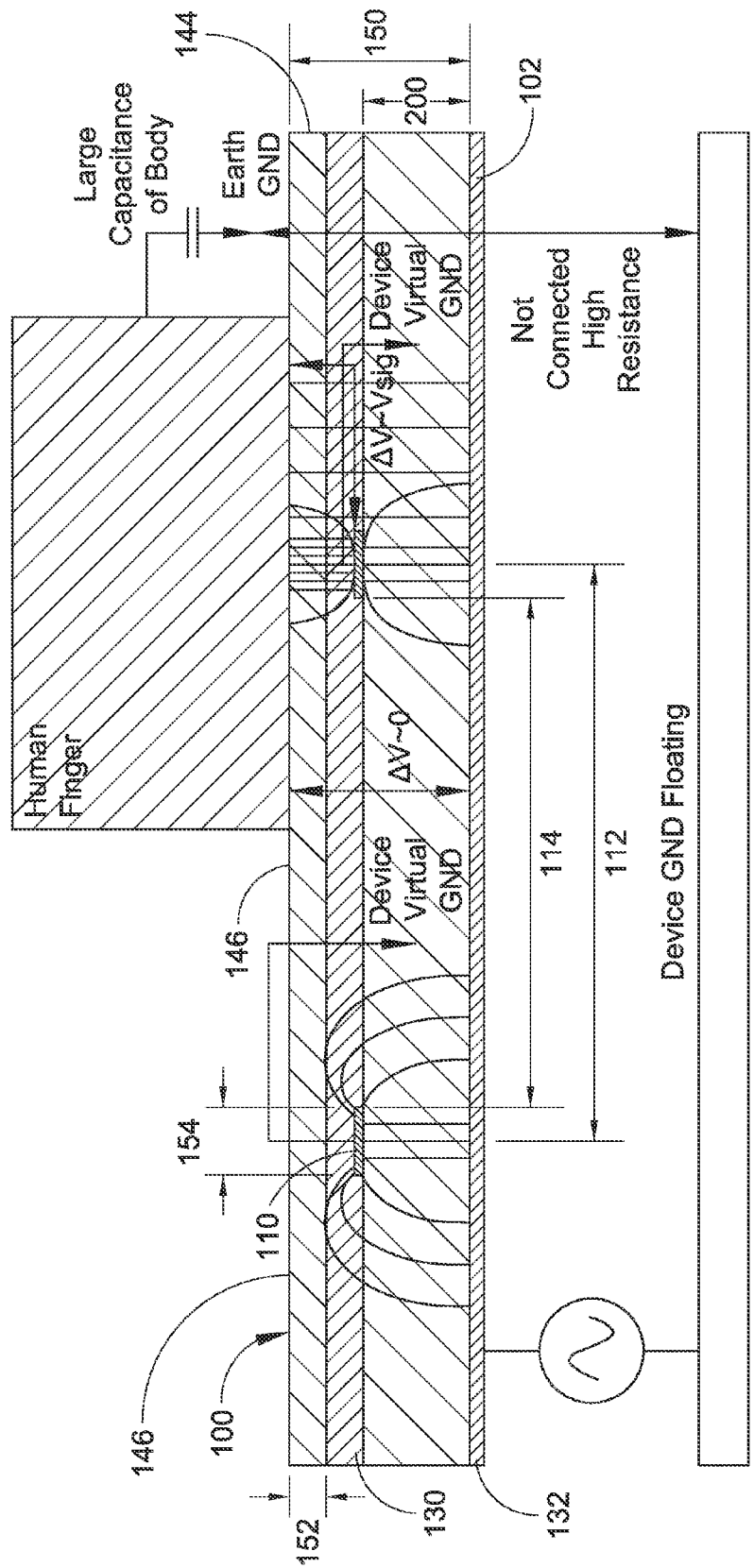
FIG. 5 is a partial cross-sectional side elevation view of the electronic device illustrated in FIG. 4, where the electronic device is not grounded.
Figure 6:
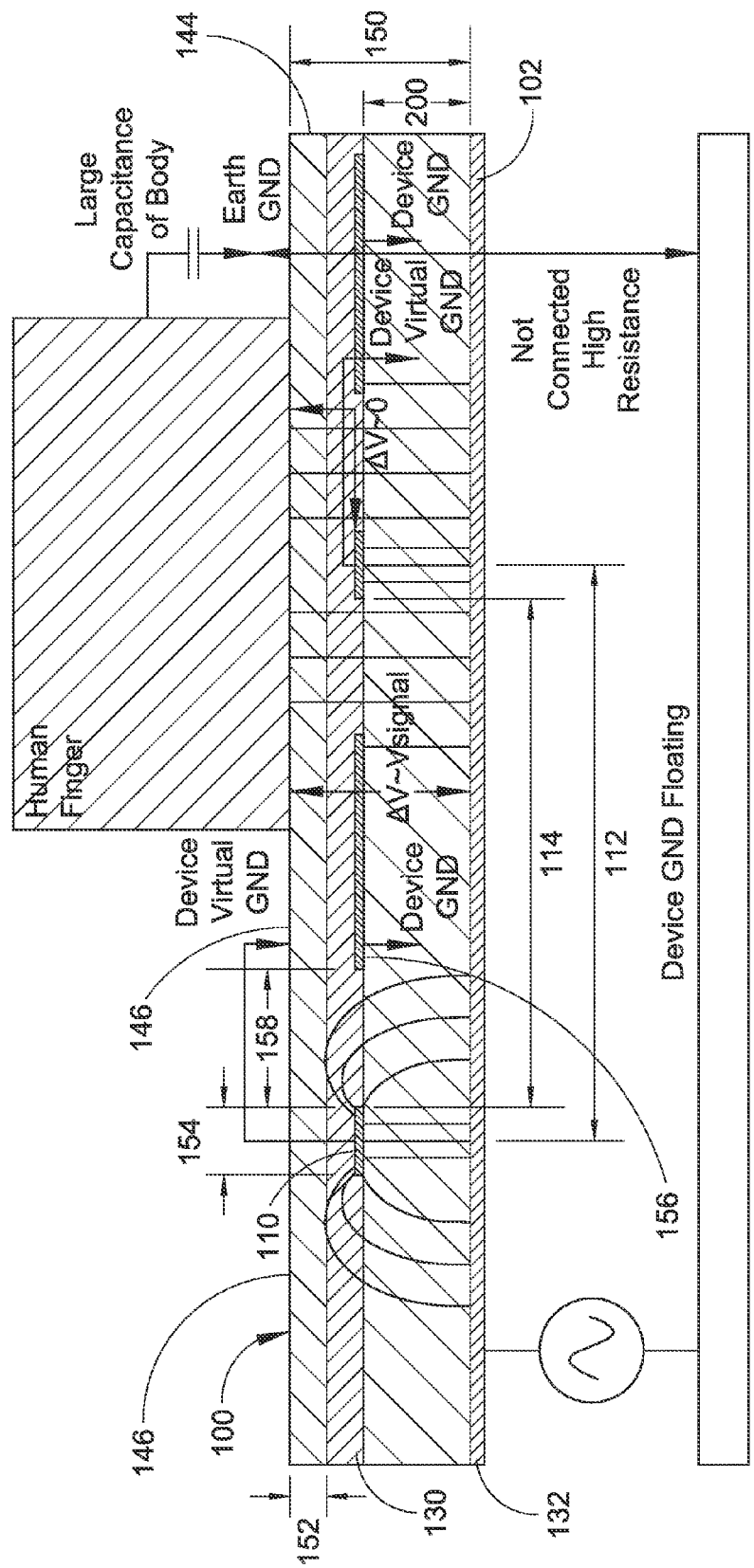
FIG. 6 is a partial cross-sectional side elevation view illustrating an electronic device incorporating a touch panel having ground electrodes in addition to drive and sensor electrodes in accordance with example implementations of the present invention, where the electronic device is not grounded.
Figure 7:
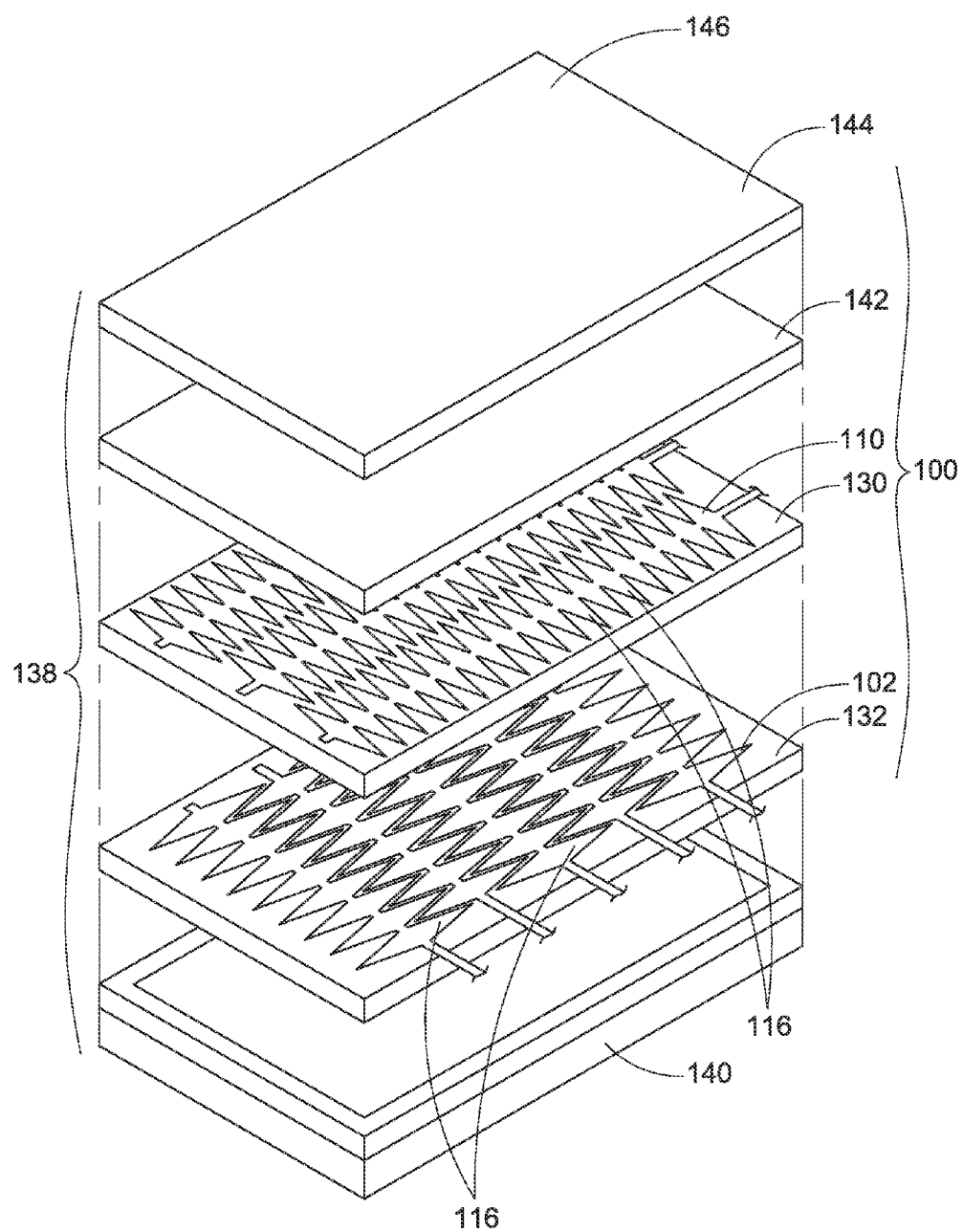
FIG. 7 is an exploded isometric view illustrating a touch screen assembly incorporating a touch panel having sensor and drive electrodes including repeating protrusions in accordance with example implementations of the present disclosure.

Referring now to FIGS. 4 through 6, the separation distance 200 between a sensor electrode 110 and a drive electrode 102 may be greater than that of a typical capacitive touch panel. In implementations, the separation distance 200 may range from about twenty five micrometers (25 µm) to about five hundred micrometers (500 µm). For example, the separation distance 200 may range from about fifty micrometers (50 µm) to about five hundred micrometers (500 µm) (e.g., to minimize effects of a floating condition on the capacitive touch panel 100). In other implementations, the separation distance 200 between a sensor electrode 110 and a drive electrode 102 may be less than that of a typical capacitive touch panel. For instance, the separation distance 200 may range from about ten micrometers (10 µm) to about one hundred micrometers (100 µm) (e.g., to exaggerate effects of a floating condition on the capacitive touch panel 100).

Further, the separation distance 152 between the touch surface 146 of a capacitive touch panel 100 and a sensor electrode 110 may be less than that of a typical capacitive touch panel. In implementations, the separation distance 152 may range from about two tenths of a millimeter (0.2 mm) to about two millimeters (2 mm). For example, the separation distance 152 may range from about two hundred micrometers (200 µm) to about one thousand micrometers (1,000 µm) (e.g., to minimize effects of a floating condition on the capacitive touch panel 100). As shown in FIGS. 4 through 6, the glass thickness of a capacitive touch panel 100 is reduced with respect to a typical touch panel configuration. This reduction in thickness may also increase the reduction in mutual capacitance, dCm, as more drive-sensor electric field lines may be attracted by an instrument used to touch the panel, such as a finger, a stylus, and so forth.

In other implementations, the separation distance 152 between the touch surface 146 of a capacitive touch panel 100 and a sensor electrode 110 may be greater than that of a typical capacitive touch panel. For instance, the separation distance 152 may range from about one thousand micrometers (1,000 µm) to about two thousand micrometers (2,000 µm) (e.g., to exaggerate effects of a floating condition on the capacitive touch panel 100). In implementations, the glass thickness of a capacitive touch panel 100 may be increased with respect to a typical touch panel configuration to provide more separation between the touch surface 146 and the sensor electrodes 110.

The characteristic spacing 114 of the sensor electrodes 110 can be selected to provide closely spaced electrodes. In implementations, the characteristic spacing 114 of the sensor electrodes 110 may range from about one millimeter (1 mm) to about ten millimeters (10 mm). For example, the characteristic spacing 114 may range from about one millimeter (1 mm) to about three millimeters (3 mm) (e.g., to minimize effects of a floating condition on the capacitive touch panel 100). In other implementations, the characteristic spacing 114 of the sensor electrodes 110 can be selected to provide widely spaced electrodes. For instance, the characteristic spacing 114 may range from about three millimeters (3 mm) to about four and one half millimeters (4.5 mm) (e.g., to exaggerate effects of a floating condition on the capacitive touch panel 100).

In implementations, the sensor electrodes 110 may have a broad characteristic width 154. In implementations, the characteristic width 154 of the sensor electrodes 110 may range from about two tenths of a millimeter (0.2 mm) to about three millimeters (3 mm). For example, the characteristic width 154 of the sensor electrodes 110 may range from about one millimeter (1 mm) to about three millimeters (3 mm) (e.g., to minimize effects of a floating condition on the capacitive touch panel 100). In other implementations, the sensor electrodes 110 may have a narrow characteristic width 154. For example, the characteristic width 154 may range from about two tenths of a millimeter (0.2 mm) to about one millimeter (1 mm) (e.g., to exaggerate effects of a floating condition on the capacitive touch panel 100).

Referring to FIGS. 6 and 10A through 10C, the capacitive touch panel 100 may include one or more grounded electrodes 156 disposed between adjacent sensor electrodes 110. The grounded electrodes 156 can be used to block electric field lines between the drive electrodes 102 and a finger (e.g., as shown in FIG. 6). It should be noted that to provide sufficiently large C_fringe attraction of electric field lines by a finger, the gap 158 between the edge of a grounded electrode 156 and the edge of a sensor electrode 110 may be much larger than the gap between the sensor electrode 110 and an adjacent drive electrode 102. For example, the gap 158 between a grounded electrode 156 and a sensor electrode 110 may range from about five to about one hundred times (5-100×) the gap between adjacent sensor and drive electrodes.

Figure 9A:
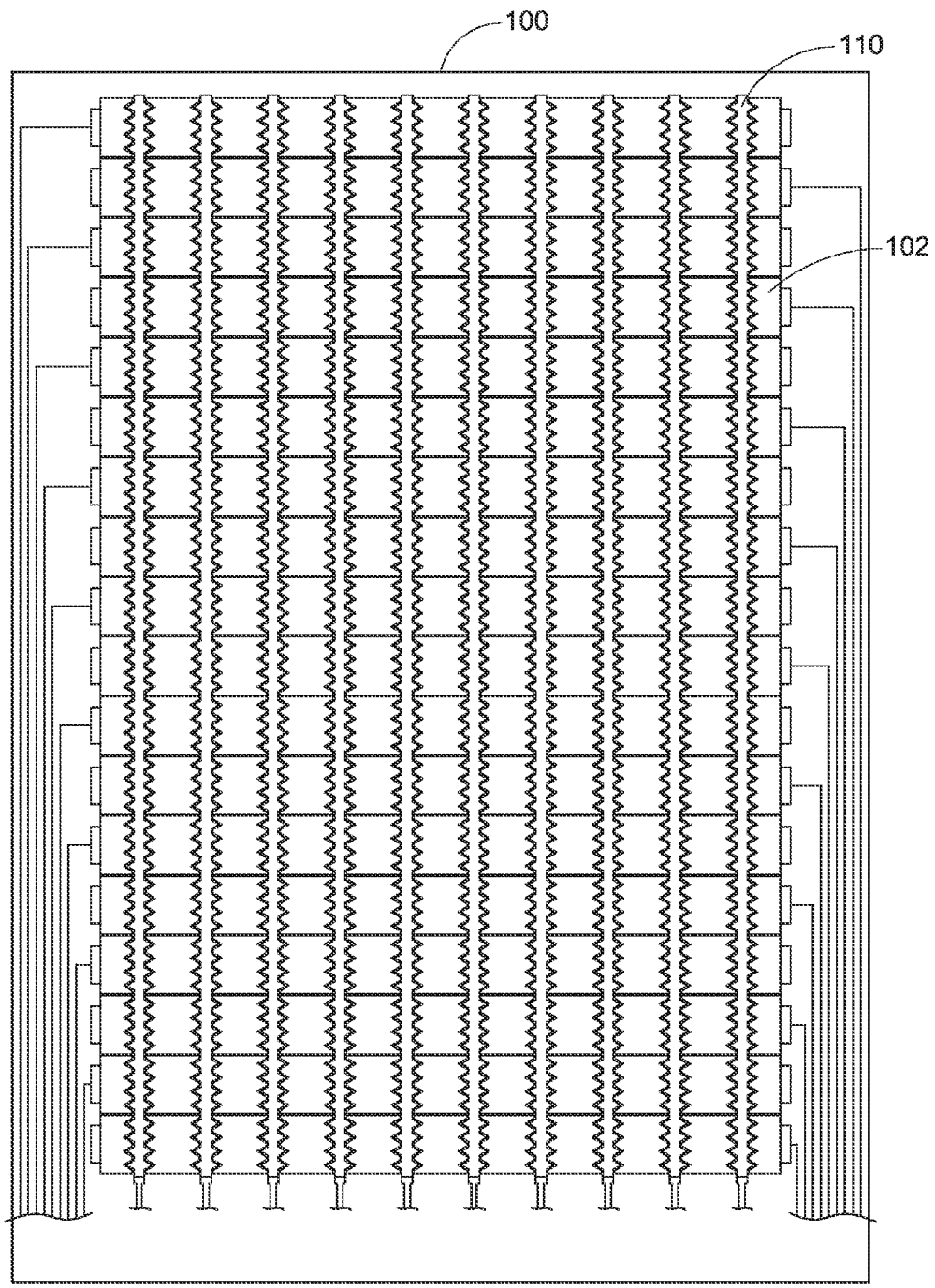
Figure 9C:
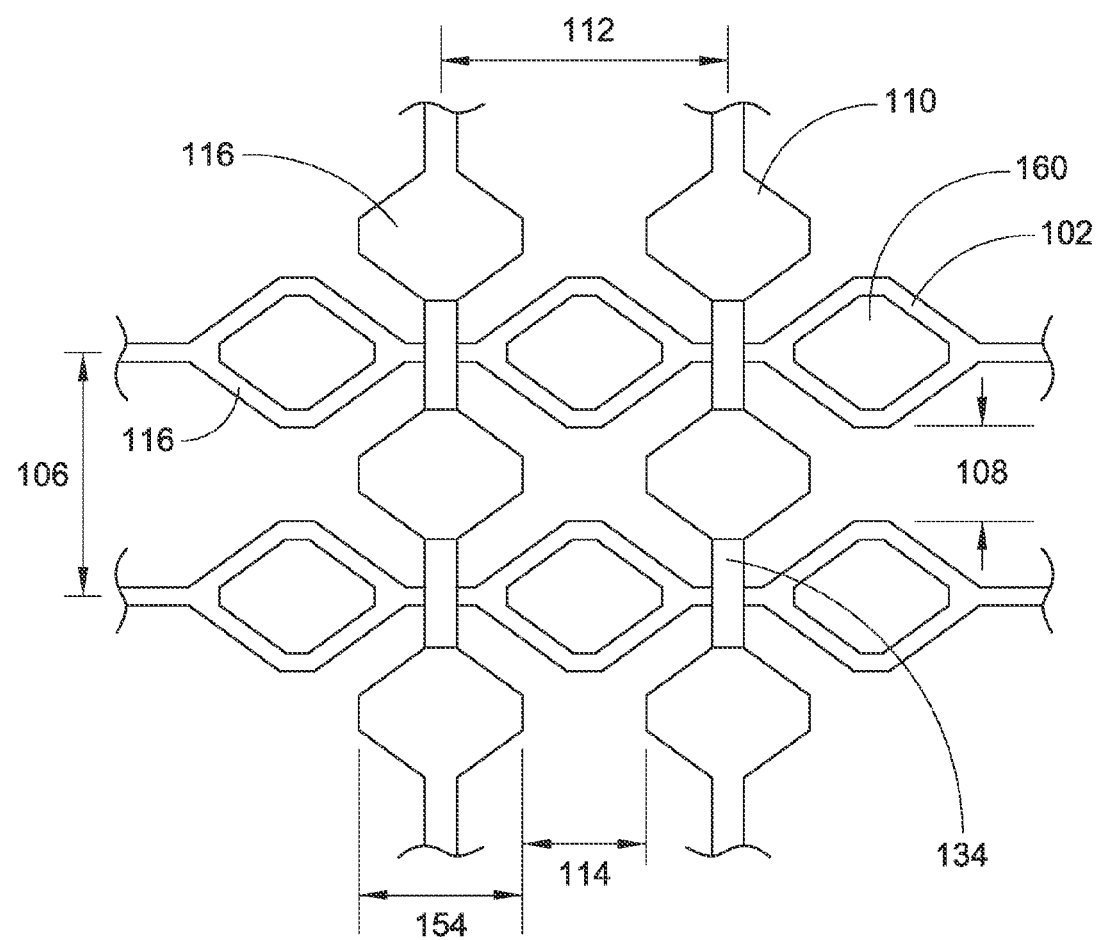
FIG. 9C is a top plan view illustrating diamond-shaped sensor and drive electrodes for a touch panel, where the sensor and drive electrodes are positioned on a single layer with jumpers connecting portions of the sensor electrodes, and where the drive electrodes define apertures within interior regions of the drive electrodes in accordance with example implementations of the present disclosure.
Figure 10A:
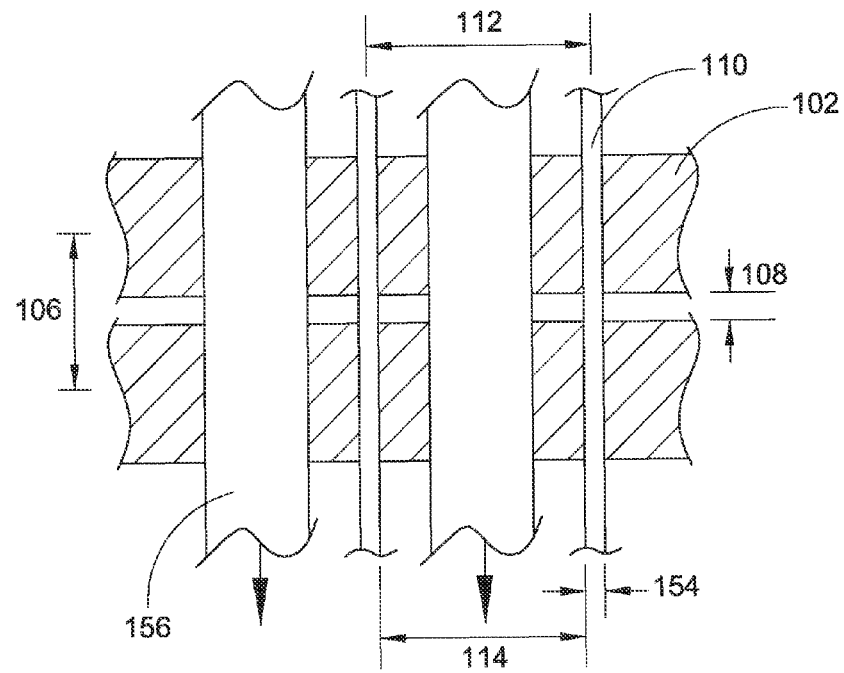
FIG. 10A is a top plan view illustrating sensor and drive electrodes for a touch panel, where ground electrodes are positioned between the sensor electrodes in accordance with example implementations of the present disclosure.
Figure 10B:
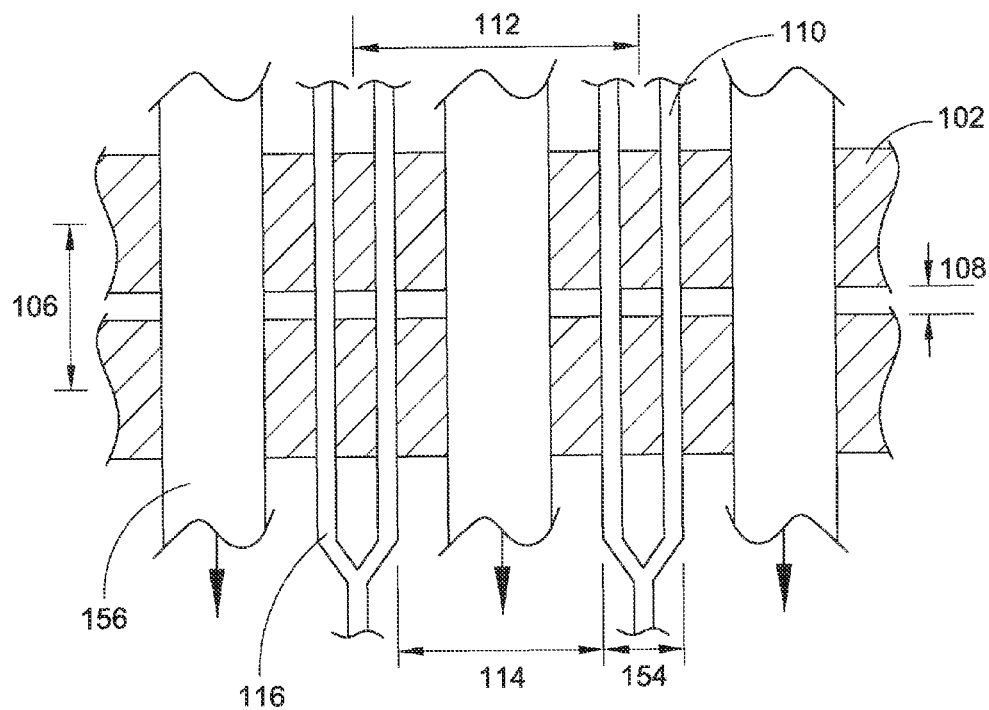
FIG. 10B is a top plan view illustrating sensor and drive electrodes for a touch panel, where the sensor electrodes include multiple parallel sensor electrode lines per sensor electrode connection, and where ground electrodes are positioned between the sensor electrodes in accordance with example implementations of the present disclosure.
Figure 10C:
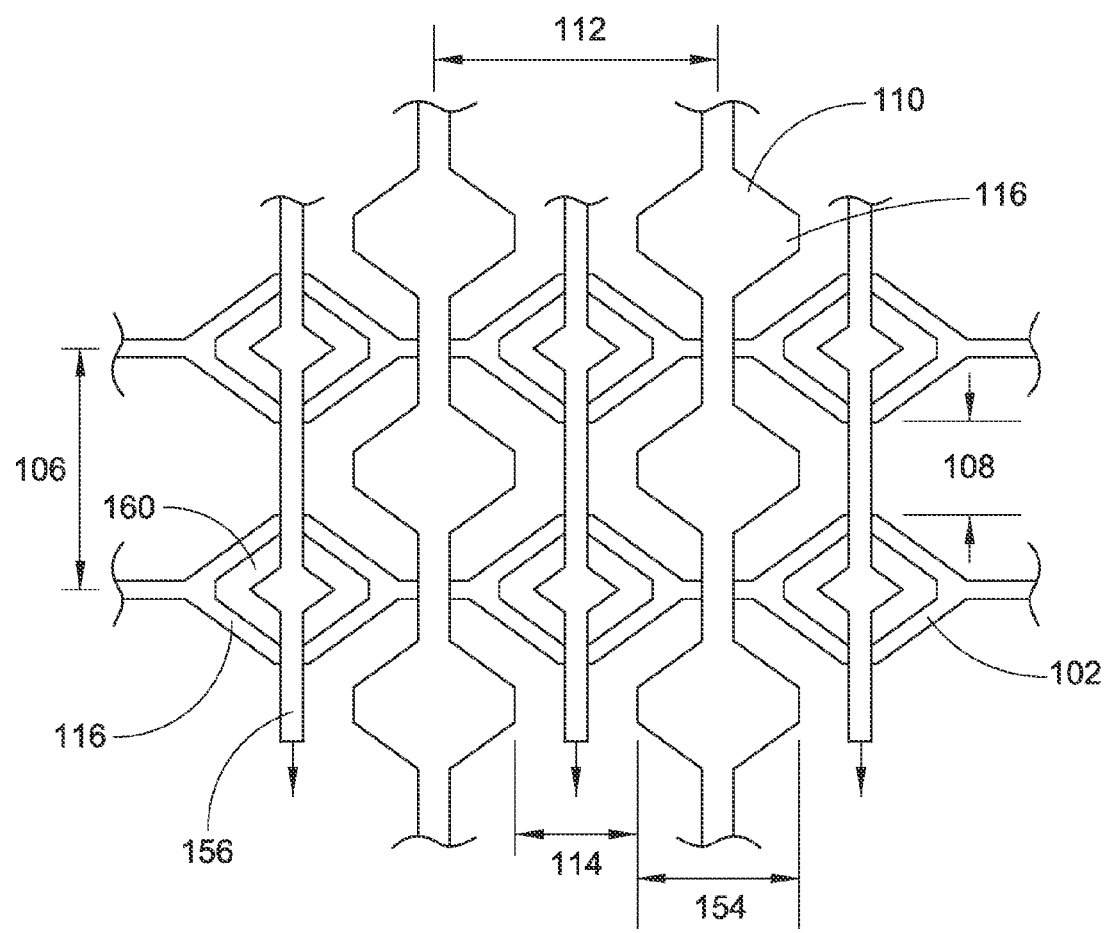
FIG. 10C is a top plan view illustrating diamond-shaped sensor and drive electrodes for a touch panel, where the drive electrodes define apertures within interior regions of the drive electrodes, and where ground electrodes are positioned between the sensor electrodes in accordance with example implementations of the present disclosure.

Referring now to FIGS. 9C and 10C, one or more of the drive electrodes 102 may define an aperture 160 within an interior portion of a drive electrode (e.g., in a region that does not contribute significantly to Cm via capacitive coupling to the sensor electrodes 110). The aperture 160 may be configured to reduce capacitive coupling between a touch instrument such as a finger and the drive electrodes 102.

Referring to FIGS. 7 through 9C and 10B and 10C, the sensor electrodes 110 and/or the drive electrodes 102 may include a series of one or more fins/protrusions 116 into the spaces between adjacent electrodes. In implementations, the bars 104 of the sensor electrodes 110 and/or the drive electrodes 102 can act as spines for the protrusions 116. The protrusions 116 may taper away from the sensor electrodes 110 and/or the drive electrodes 102. For example, the protrusions 116 can be repeating and triangle-shaped (e.g., sawtoothed as shown in FIGS. 7, 8A, 8B, 8E, 8F, 9A and 9B). Further, the protrusions 116 can extend past a center line 118 defined between adjacent sensor electrodes 110 and/or adjacent drive electrodes 102 (e.g., as shown in FIGS. 8B, 8C, and 8F, where the protrusions 116 are interleaved).

It should be noted that the protrusions 116 can provide a capacitive touch panel 100 with a broader and more linear touch profile in both the X and Y-directions (e.g., providing a signal that is suitable for interpolation). For example, as an instrument having a touch profile 120 moves across a capacitive touch panel 100 having protrusions 116 formed in a sawtooth pattern, the responses of the electrodes will be more linear/decrease less rapidly as the instrument moves into the spaces between the sensor electrodes 110 (e.g., when compared to a configuration having rectangular column bars). For instance, a stylus may have a uniformly changing coupling to adjacent column traces as it moves across the traces in the X-direction, and the computed touch coordinates will therefore change much more uniformly with minimal dead zones. This can improve signal reception such that the crossover point between signals from adjacent sensor electrodes 110 may remain above the noise threshold of the touch panel, resulting in a constant signal between the various coordinate locations. Thus, capacitive touch panels 100 employing this configuration may be used with a stylus having a touch diameter substantially less than the touch diameter of a finger, even when the electrodes of the touch panel comprise a pitch based upon the touch diameter of a finger.

Figure 8C:
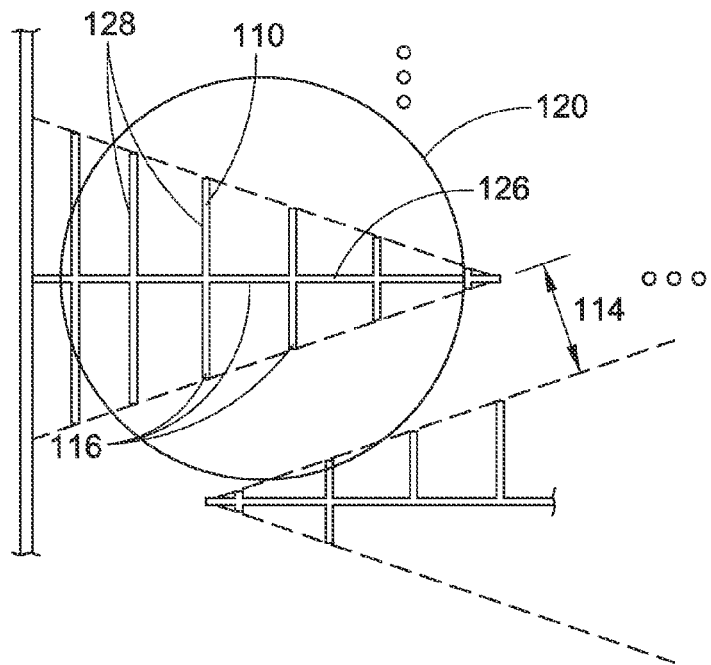
FIG. 8C is a top plan view illustrating sensor electrodes for a touch panel, where the sensor electrodes include repeating protrusions, and each repeating protrusion includes finger-like protrusions in accordance with example implementations of the present disclosure.

The protrusions 116 can be configured to provide the sensor electrodes 110 and/or the drive electrodes 102 with an increased perimeter with respect to the surface area occupied by the electrodes (and a decreased surface area with respect to the perimeter). This configuration can furnish an increased edge-length for the electrodes, which may reduce bottom plate mutual capacitance between the sensor electrodes 110 and the drive electrodes 102, and enhance the fringe mutual capacitance of the sensor electrodes 110 and their interaction with an instrument such as a finger. In some implementations, the protrusions 116 can be circuitously-shaped, and so forth. With reference to FIG. 8C, the protrusions 116 can occupy a generally triangular area, having a number of primary/main protrusions 126 with one or more finger-like (thin rectangular) protrusions 128 extending from each main protrusion 126. This configuration may provide a more linear change in, for example, finger profile as an instrument moves away from one electrode and toward another electrode. It should be noted that while FIG. 8C illustrates the spacing between the finger-like protrusions 128 increasing farther from the axes of sensor electrodes 110, the spacing between the finger-like protrusions 128 may also decrease farther from the axes of sensor electrodes 110, may be relatively constant, or may increase and decrease in an alternating, random, or semi-random pattern. Further, it should be noted that the finger-like protrusions 128 may themselves have protrusions (e.g., exhibiting self-similarity), and so forth.

Figure 8D:
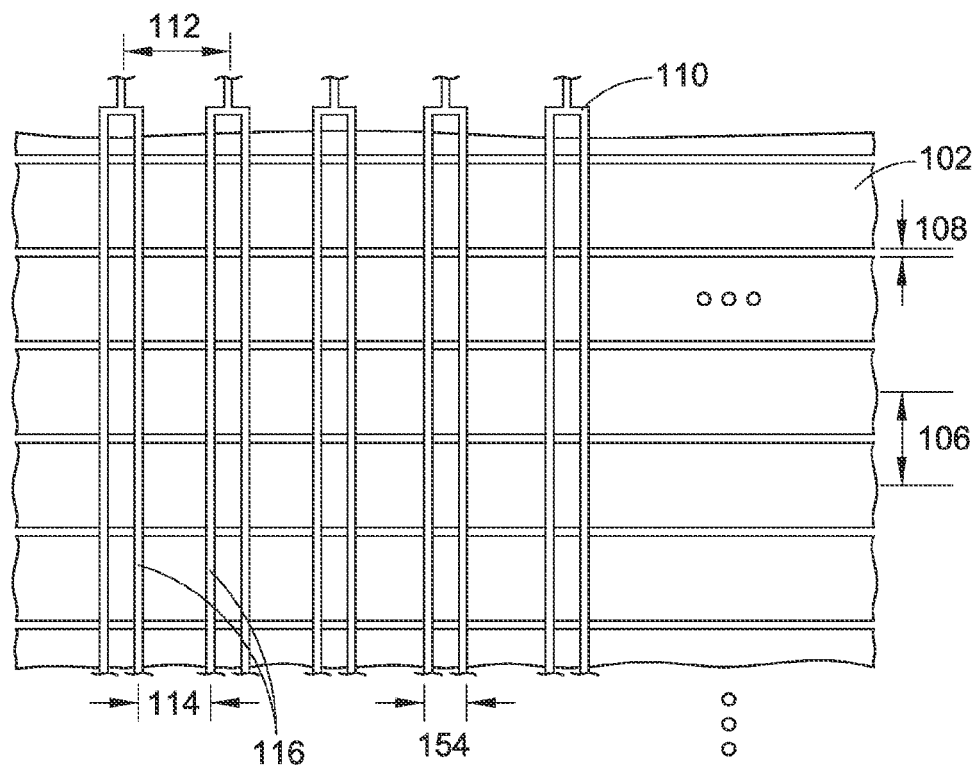
FIG. 8D is a top plan view illustrating sensor and drive electrodes for a touch panel, where the sensor electrodes include multiple parallel sensor electrode lines per sensor electrode connection in accordance with example implementations of the present disclosure.
Figure 8E:
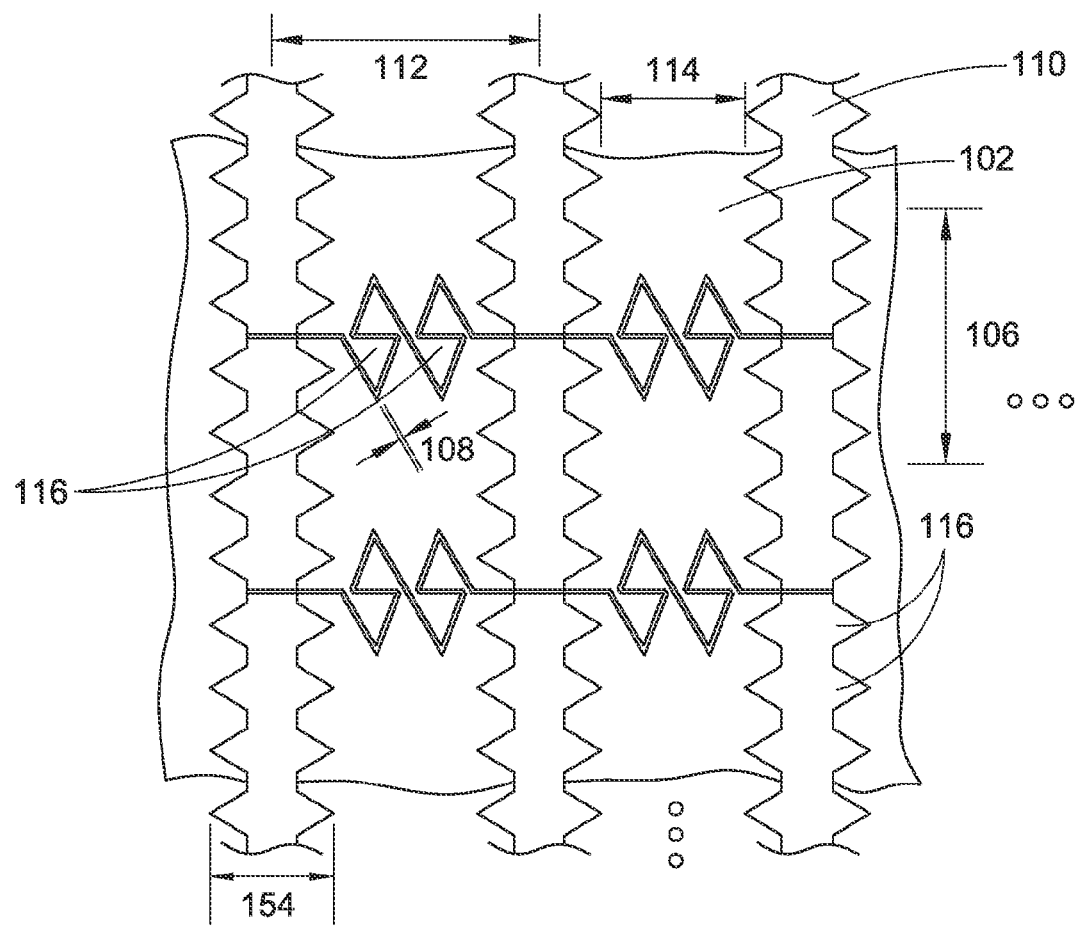
FIG. 8E is a top plan view illustrating sensor and drive electrodes for a touch panel, where the sensor and drive electrodes include repeating protrusions in accordance with example implementations of the present disclosure.
Figure 8F:
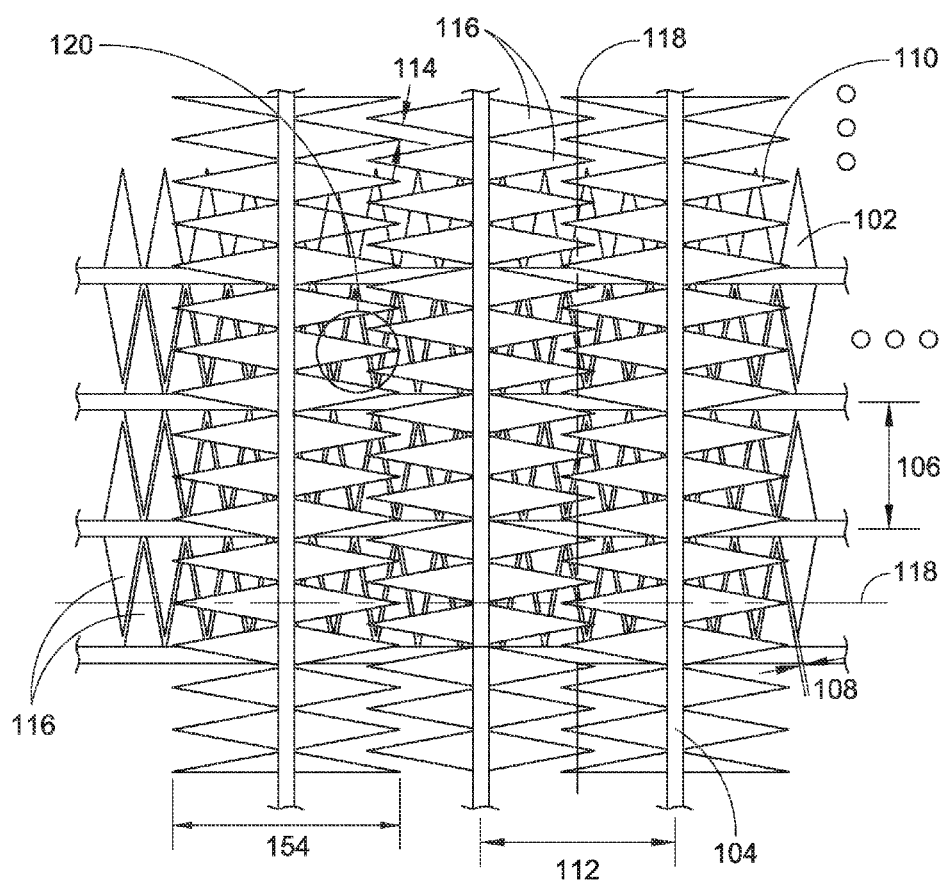
FIG. 8F is a top plan view illustrating sensor and drive electrodes for a touch panel, where the sensor and drive electrodes include repeating protrusions extending past center lines between the sensor and drive electrodes in accordance with example implementations of the present disclosure.

With reference to FIGS. 8D and 10B, multiple sensor electrode lines may be provided per sensor electrode connection. For example, protrusions 116 can occupy a generally rectangular area defining a rectangular gap therein (e.g., to minimize effects of a floating condition on the capacitive touch panel 100). In implementations, two, three, or more than three sensor electrode lines can be used per sensor electrode connection. This configuration may serve to blur the sharp finger profile for a stylus, and slightly extend the coverage of the profile. It should be noted that the drive electrodes 102 and the sensor electrodes 110 may each have differently shaped protrusions. For example, sawtooth-shaped protrusions may be used with the drive electrodes 102, while finger-like protrusions may be used with the sensor electrodes 110. Further, different rows of one kind/layer of electrode may have different protrusions. For example, one row of sensor electrodes 110 may have finger-like protrusions, while an adjacent row of sensor electrodes 110 may have sawtooth-shaped protrusions, and so forth. In implementations, a dynamic reduction of the noise threshold for image zeroing may also be used (e.g., to extend the finger profile for a stylus, and so forth).

In implementations, the characteristic spacing 114 of the sensor electrodes 110 is at least substantially greater than the characteristic spacing 108 of the drive electrodes 102. For example, it may be desirable to maintain a greater spacing between the sensor electrodes 110 relative to the spacing between the drive electrodes 102 in order to reduce column-to-column capacitance and provide sufficient fringe capacitance from the edges/sides of the sensor electrodes 110 to the drive electrodes 102. Further, it may be desirable to maintain a tighter spacing between the drive electrodes 102 relative to the sensor electrodes 110 in order to shield the sensor electrodes 110 from noise generated by other circuitry (e.g., noise from an underlying Liquid Crystal Display (LCD) screen, and so forth). In implementations, the characteristic spacing 114 of the sensor electrodes 110 is between about five times and about 100 times (5-100×) the characteristic spacing 108 of the drive electrodes 102. However, this spacing is provided by way of example only and is not meant to be restrictive of the present disclosure. Thus, the characteristic spacing 114 of the sensor electrodes 110 can be less than five times (5×) and/or more than one hundred times (100×) (e.g., two hundred times (200×)) the characteristic spacing 108 of the drive electrodes 102. It should be noted that the gap between drive electrodes 102 can be very small (e.g., as determined by manufacturing tolerances, and so forth).

The sensor electrodes 110 are electrically insulated from the drive electrodes 102 (e.g., using a dielectric layer, and so forth). For example, the sensor electrodes 110 may be provided on one substrate (e.g., comprising a sensor layer 130 disposed on a glass substrate), and the drive electrodes 102 may be provided on a separate substrate (e.g., comprising a drive layer 132 disposed on another substrate). In this two-layer configuration, the sensor layer 130 can be disposed above the drive layer 132 (e.g., with respect to a touch surface). For example, the sensor layer 130 can be positioned closer to a touch surface than the drive layer 132. However, this configuration is provided by way of example only and is not meant to be restrictive of the present disclosure. Thus, other configurations can be provided where the drive layer 132 is positioned closer to a touch surface than the sensor layer 130, and/or where the sensor layer 130 and the drive layer 132 comprise the same layer. For instance, in a 1.5-layer implementation (e.g., where the drive layer 132 and the sensor layer 130 are included on the same layer but physically separated from one another), one or more jumpers 134 can be used to connect portions of a drive electrode 102 together (e.g., as illustrated in FIGS. 9A and 9B). Similarly, jumpers can be used to connect portions of a sensor electrode 110 together (e.g., as illustrated in FIG. 9C).

One or more capacitive touch panels 100 can be included with a touch screen assembly 138. The touch screen assembly 138 may include a display screen, such as an LCD screen 140, where the sensor layer 130 and the drive layer 132 are sandwiched between the LCD screen 140 and a bonding layer 142, e.g., with a protective cover 144 (e.g., glass) attached thereto. The protective cover 144 may include a protective coating, an anti-reflective coating, and so forth. The protective cover 144 may comprise a touch surface 146, upon which an operator can use one or more fingers, a stylus, and so forth to input commands to the touch screen assembly 138. The commands can be used to manipulate graphics displayed by, for example, the LCD screen 140. Further, the commands can be used as input to an electronic device connected to a capacitive touch panel 100, such as a multimedia device or another electronic device (e.g., as previously described).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a mutual capacitance projected capacitive touch (PCT) panel, the PCT panel including a device ground, a plurality of elongated drive electrodes disposed, in a first layer, in a plurality of columns and a plurality of elongated sensor electrodes disposed, in a second layer separated from the first layer by a separation distance, in a plurality of sequential rows across the plurality of drive electrodes, wherein:
   an arrangement of the plurality of drive electrodes and the plurality of sensor electrodes define a coordinate system where each coordinate location includes a capacitor formed at an intersection between one of the plurality of drive electrodes and one of the plurality of sensor electrodes;
   the arrangement is configured such that:
      a first capacitance between a touch location and the at least one sensor electrode is substantially larger than a second capacitance between the touch and at least one drive electrode, irrespective of whether or not the PCT panel is electrically connected to ground;
      at least one grounded electrode is electrically coupled with the device ground and is disposed, in or proximate to the second layer, such that an elongated portion of the at least one grounded electrode is disposed across the plurality of drive electrodes, parallel to and between two adjacent ones of the sequential rows, the grounded electrode configured to at least partially block electric field lines between the at least one drive electrode and the touch location; and
      no grounded electrode is disposed in or proximate to the first layer.

2. The mutual capacitance PCT panel as recited in claim 1, wherein the separation distance is between at least approximately twenty five micrometers (25) μm and at least approximately five hundred micrometers (500 μm).

3. The mutual capacitance PCT panel as recited in claim 1, wherein the plurality of sensor electrodes comprises a characteristic spacing between at least approximately one millimeter (1 mm) and at least approximately ten millimeters (10 mm).

4. The mutual capacitance PCT panel as recited in claim 1, wherein each one of the plurality of sensor electrodes comprises a characteristic width between at least approximately two tenths of a millimeter (0.2 mm) and at least approximately three millimeters (3 mm).

5. An apparatus comprising:
a mutual capacitance Projected Capacitive Touch (PCT) panel, the PCT panel including a device ground, a plurality of elongated drive electrodes disposed, in a first layer, in a plurality of columns and a plurality of elongated sensor electrodes disposed, in a second layer separated by a second separation distance from the first layer, in a plurality of sequential rows across the plurality of drive electrodes, wherein:
   an arrangement of the plurality of drive electrodes and the plurality of sensor electrodes define a coordinate system where each coordinate location comprises a capacitor formed at an intersection between one of the plurality of drive electrodes and one of the plurality of sensor electrodes;
   a first separation between a touch surface of the PCT panel and at least one of the plurality of sensor electrodes is between at least approximately two hundred micrometers (200 μm) and at least approximately nine hundred micrometers (900 μm);

the second separation distance is between at least approximately twenty five micrometers (25 μm) and at least approximately five hundred micrometers (500 μm);

the first separation distance is substantially larger than the second separation distance; and the arrangement is configured such that:

at least one grounded electrode is electrically coupled with the device ground and is disposed, in or proximate to the second layer, such that an elongated portion of the at least one grounded electrode is disposed across the plurality of drive electrodes, parallel to and between two adjacent ones of the sequential rows, the grounded electrode configured to at least partially block electric field lines between the at least one drive electrode and the touch location; and no grounded electrode is disposed in or proximate to the first layer.

6. The mutual capacitance PCT panel as recited in claim 5, wherein the plurality of sensor electrodes comprises a characteristic spacing between at least approximately one millimeter (1 mm) and at least approximately ten millimeters (10 mm).

7. The mutual capacitance PCT panel as recited in claim 5, wherein each one of the plurality of sensor electrodes comprises a characteristic width between at least approximately two tenths of a millimeter (0.2 mm) and at least approximately three millimeters (3 mm).

* * * * *